Figure 1:
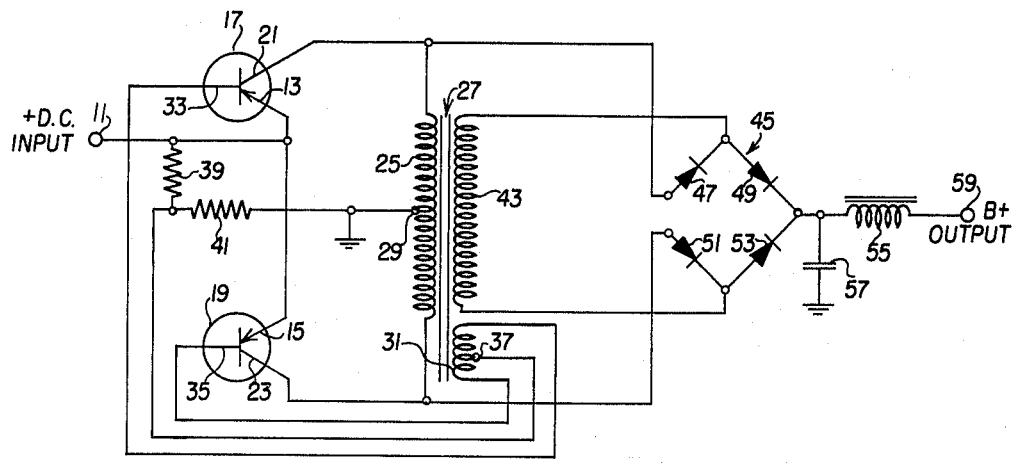

March 15, 1966   W. L. FIRESTONE   3,241,032
CONVERTER CIRCUIT UTILIZING PRIMARY SWITCHING VOLTAGE
Filed Oct. 16, 1962

INVENTOR.
WILLIAM L. FIRESTONE
BY
Mueller and Aichele ATTYS.

United States Patent Office 3,241,032
Patented Mar. 15, 1966

3,241,032
CONVERTER CIRCUIT UTILIZING PRIMARY SWITCHING VOLTAGE
William L. Firestone, Highland Park, Ill., assignor, by mesne assignments, to The Bendix Corporation, Baltimore, Md., a corporation of Delaware
Filed Oct. 16, 1962, Ser. No. 230,904
2 Claims. (Cl. 321—2)

This invention relates to power supply systems, and more particularly to a power converter system for providing different output potentials from a given transformer.

Power converters are used in power supply systems to convert direct current from a source, such as a battery or generator, to alternating current for stepping up the voltage thereof in a transformer. This stepped up voltage is then rectified back to direct current at an increased voltage. Power supply systems incorporating such power converters are often used in mobile radio communication apparatus, and in such apparatus it is highly desirable, from a business standpoint, to minimize the cost factors involved. Transformers remain a major factor in the cost of such units. One factor in the cost of such transformers is that the transformer must be specially designed to provide the voltage required in a particular application.

Accordingly, it is an object of this invention to provide a power converter system wherein different voltages may be provided by simple changes in connection of the circuit.

Another object of the invention is to provide a power converter, for mobile communications apparatus, which may be used to provide different voltage outputs by use of a given transformer and other components having fixed values.

Still another object of the invention is to provide a simple low cost circuit for producing various output power supply voltages, which circuit is inexpensive and occupies a minimum of space.

A feature of the invention is the provision of a power converter circuit wherein at least a part of the voltage of the primary coil of the transformer is added to the secondary voltage to thereby increase the output voltage.

Another feature of the invention is the provision of a power converter having connections for applying the A.C. primary voltage in series with the secondary voltage to diodes in a bridge type rectifier circuit. To reduce the output voltage, the primary voltage may be added to the secondary voltage only during alternate half cycles.

Still another feature of the invention is the provision of a power converter including a transformer having its secondary winding connected to a bridge rectifier circuit, with one or both of the opposite polarity branches of the circuit connected to the primary winding so that at least part of the primary voltage is added to the secondary voltage and the resulting rectifier output voltage is increased.

Figure 2:
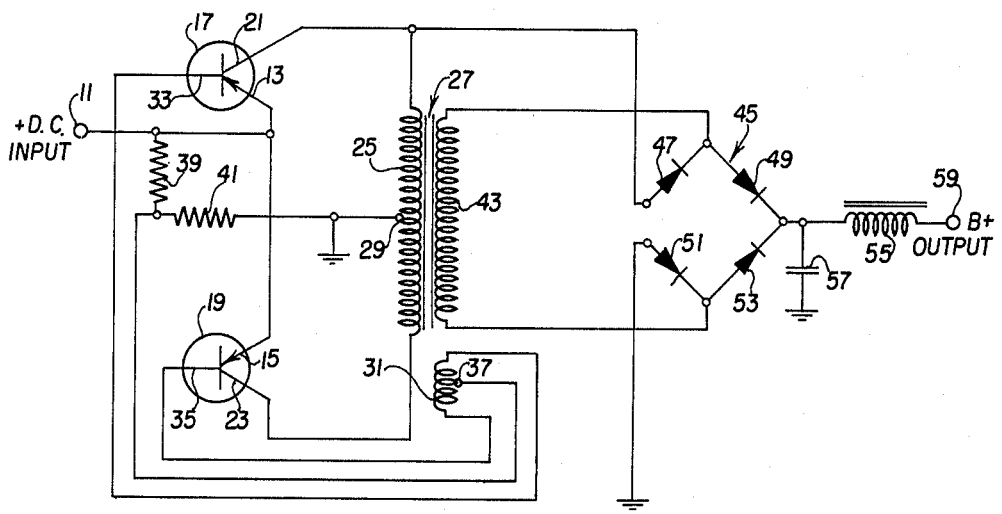

In the drawings:

FIG. 1 is a schematic diagram of a circuit constructed in accordance with the invention; and, FIG. 2 is a diagram of a second circuit embodiment of the invention.

In accordance with the invention, a direct current power source is connected to a pair of self-sustaining switching transistors which provide an A.C. output from the power source. The collector electrodes of the transistors are connected across the primary winding of a transformer, and the secondary winding of the transformer is connected to a bridge rectifier. Further connection is made from the collector electrodes of the transistors into the bridge rectifier such that the primary switching voltage applied to the primary winding of the transformer is added to the output of the secondary winding of the transformer to increase the output voltage of the power converter for a given transformer. If a lower voltage is required, the collector electrode of only one of the switching transistors can be connected to the bridge rectifier to add the primary switching voltage only during one half of the cycle.

Referring now to FIG. 1, a source of direct current potential is applied to input terminal 11 of the power converter. This potential is connected to the emitter electrodes 13 and 15 of transistors 17 and 19 respectively. The collector electrodes 21 and 23 of transistors 17 and 19 respectively are connected across the primary winding 25 of transformer 27. A grounded center tap 29 is provided on primary winding 25 so that current from each transistor flows through one half the winding.

Transformer 27 contains a feedback secondary winding 31, and the base electrodes 33 and 35 of transistors 17 and 19 respectively are connected across this secondary winding 31 is connected to a voltage divider network made up of resistors 39 and 41 to apply a portion of the input voltage as a bias to the base electrodes. The feedback connection of secondary winding 31 to base electrodes 33 and 35 controls the conduction of transistors 17 and 19, alternately biasing them to cut-off to provide a self-sustaining alternating current output.

The transformer 27 includes an output secondary winding 43 connected to a bridge rectifier circuit consisting of a first pair of series connected diodes 47 and 49 and a second pair of diodes 51 and 53, also series connected. The juncture between diodes 49 and 53, or output corner of the bridge rectifier, is connected to a direct current filter consisting of capacitor 57 and choke 55. Choke 55 is connected in series to terminal 59, which provides the output connection for the power converter.

Instead of grounding the common corner of the bridge rectifier, that is, the juncture between diodes 47 and 51, as in standard bridge rectifier circuits, connection is made from the collector electrode 21 of transistor 17 to the negative side of diode 47. Correspondingly, connection is made from the collector electrode 23 of transistor 35 to the negative side of diode 51. Output secondary winding 43 is connected across opposite corners of the bridge rectifier 45, that is, across the junctures between diodes 47 and 49 and diodes 51 and 53 respectively. A circuit is therefore completed from the output corner of the bridge rectifier, through diode 49, secondary winding 43, diode 51 and finally through the lower half of primary winding 25 to grounded center tap 29. This circuit is completed during one half of the A.C. cycle when rectifiers 49 and 51 are conductive. During the opposite half of the A.C. cycle, the operative circuit will be through diode 53, secondary winding 43, diode 47, and the upper half of primary winding 25 to ground. It should be noted that during operation of these circuits, the auto transformer action of the undriven half of primary winding 25 will help serve (along with the secondary winding) to alternately cut off diodes 47 and 53, and then diodes 49 and 51 during the next half cycle. Thus, with each wave of A.C. voltage the voltage across the operative portion of primary winding 25 will be added to the voltage across secondary winding 43 for substantially increased output voltage.

Referring now to FIG. 2, an alternative connection is shown. In this circuit, diode 51 is connected to ground and only diode 47 is connected to the collector electrode 21 of its driving transistor 17. Under these circumstances, the primary switching voltage will be added to the voltage across the secondary winding 43 of transformer 27 only during half of the cycle to provide a smaller direct current voltage at terminal 59. Thus a simple change in the wiring may be made to vary the output voltage, adding versatility to the circuit of the invention. It is also possible by this means to achieve a lower voltage than the secondary voltage alone by adding one-half or all of the primary voltage in phase opposition to the secondary voltage. Under conditions of fixed primary voltage and no availability of a dropping resistor, or under a condition when the power dissipated in a dropping resistor is undesirable, this voltage-subtracting technique may also have an advantage and eliminate a redesign problem.

Accordingly, the invention provides a power converter circuit in which various voltages may be provided by use of a given transformer. The converter includes simple circuitry and may be constructed at low cost.

I claim:

1. A power supply system for providing D.C. operating potential from a source of D.C. potential having a lesser value, including in combination, a transformer having primary and first and second secondary windings, a pair of transistors having base emitter and collector electrodes, means for connecting said emitter electrodes to the source of D.C. potential, means connecting said collector electrodes to opposite ends of said primary winding, said primary winding having a center tap connected to a reference potential, means for applying a bias potential to said pair of transistors, said first secondary winding having a center tap connected to said means for applying a bias potential, means connecting said base electrodes of said transistors to opposite ends of said first secondary winding to provide self-sustaining switching action alternately biasing said transistors to cut off, whereby an alternating current output is applied to said primary winding, a rectifier bridge circuit including a pair of oppositely poled diode rectifiers connected to one end of said second secondary winding, a second pair of oppositely poled diode rectifiers connected to the opposite end of said second secondary winding, output filter means connected to each end of said second secondary winding to provide a filtered D.C. output, means connecting the other rectifier connected to each end of said secondary winding to the ends of said primary windings respectively, whereby the voltage across the operative portion of said primary winding is added to the voltage across said second secondary winding at said conductor means, to provide a rectified D.C. output potential which is substantially increased over the potential resulting from the voltage in said second secondary winding.

2. A power supply system for providing D.C. operating potential from a source of D.C. potential having a lesser value, including in combination, a transformer having primary and first and second secondary windings, a pair of transistors having base, emitter and collector electrodes, means for connecting said emitter electrodes to a source of D.C. potential, means connecting said collector electrodes to opposite ends of said primary winding, said primary winding having a center tap connected to a reference potential, means for applying a bias potential to said pair of transistors, said first secondary winding having a center tap connected to said means for applying a bias potential, means connecting said base electrodes of said transistors to opposite ends of said first secondary winding to provide a self-sustaining switching action alternately biasing said transistors to cut off whereby an alternating current output is applied to said primary winding, a rectifier bridge circuit including a pair of oppositely poled diode rectifiers connected to one end of said second secondary winding, a second pair of oppositely poled diode rectifiers connected to the opposite end of said second secondary winding, output filter means connected to one rectifier connected to each end of said second secondary winding, to provide a filtered D.C. output, means connecting one of the other rectifiers connected to an end of said secondary winding to one end of said primary winding, and means connecting the other of the other rectifiers connected to an end of said secondary winding to a reference potential, whereby the voltage across the operative portion of said primary winding is added to the voltage across said second secondary winding at said conductor means on every other cycle to provide a rectified D.C. output potential which is substantially increased over the potential resulting from the voltage in said secondary winding.

References Cited by the Examiner
UNITED STATES PATENTS

| | | | |
|---|---|---|---|
| 1,321,505 | 11/1919 | Brackett | 321—21 |
| 2,948,841 | 8/1960 | Locanthi et al. | 331—113.1 |
| 3,048,764 | 8/1962 | Murphy | 321—45 |

LLOYD McCOLLUM, *Primary Examiner.*